Oct. 28, 1930. P. O. LONGYEAR 1,779,818
POSITION INDICATING APPARATUS
Filed July 26, 1929 2 Sheets-Sheet 1

Inventor
Philip O. Longyear,
By Lyon & Lyon
Attorneys

Oct. 28, 1930.   P. O. LONGYEAR   1,779,818
POSITION INDICATING APPARATUS
Filed July 26, 1929   2 Sheets-Sheet 2
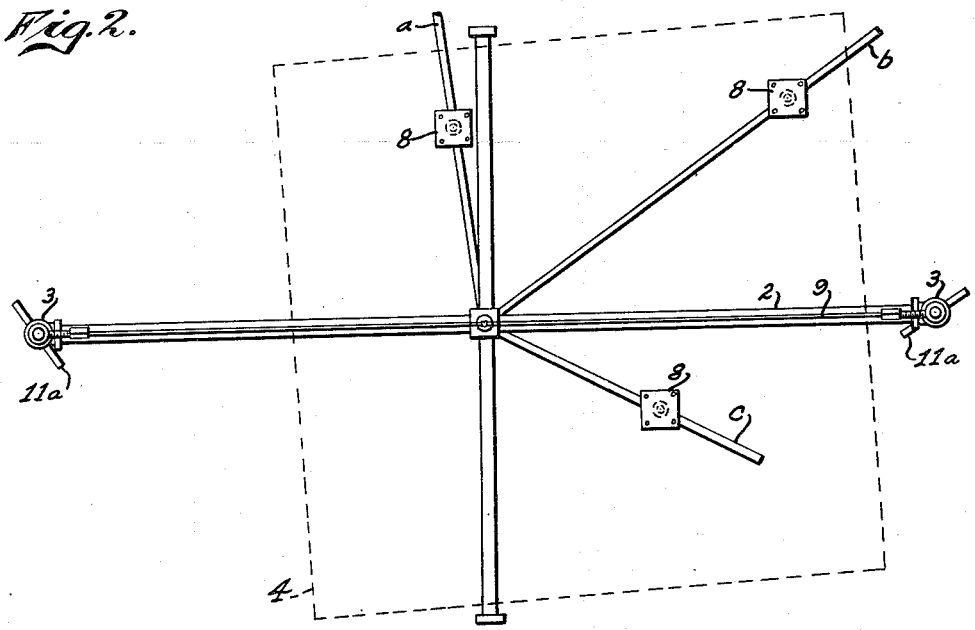
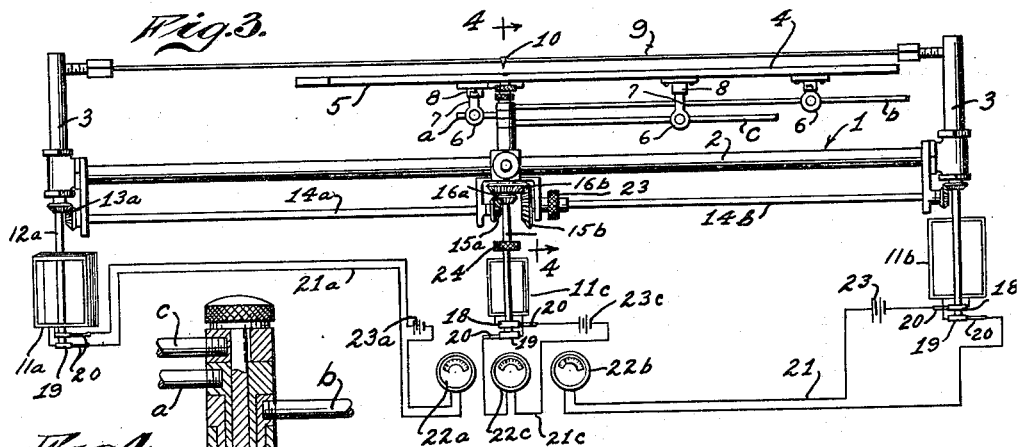
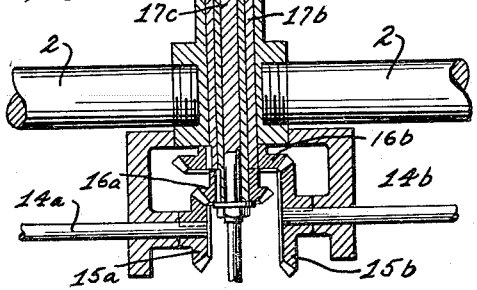
Inventor
Philip O. Longyear;
By Lyon & Lyon
Attorneys Patented Oct. 28, 1930

1,779,818

UNITED STATES PATENT OFFICE

PHILIP O. LONGYEAR, OF CORONA DEL MAR, CALIFORNIA

POSITION-INDICATING APPARATUS

Application filed July 26, 1929. Serial No. 381,138.

This invention relates to an instrument for indicating the position of a person or vehicle carrying the instrument, on a map. It operates on the principle that underlies the operation of a surveyor's plane table.

The general object of the invention is to provide simple means for indicating the geographical position of a traveler, on a map, or to indicate his position with relation to known fixed points on the earth.

A further object of the invention is to produce an instrument of this kind on which a map on a relatively small scale can be carried as a guide to a traveler, for example, an aviator in traveling a long distance, and to provide means whereby a local map can be readily interchanged for the small scale map when the traveler has arrived near his destination, the instrument being so constructed as to indicate at all times the position of the traveler on either the general small scale map or on the particular local large scale map which is substituted for it.

Further objects of the invention will appear hereinafter.

The invention consists in the novel parts and combination of parts to be described hereinafter, all of which contribute to produce an efficient position indicating apparatus.

A preferred embodiment of the invention is described in the following specification, while the broad scope of the invention is pointed out in the appended claims.

In the drawings:

Figure 2 is a plan of the instrument, representing the map-supporting platen in dotted outline.

Figure 3 is a diagrammatic view showing the apparatus complete and with the parts of the instrument in elevation, and illustrating diagrammatically the electrical circuits which are preferably employed in using the apparatus.

Figure 4 is a vertical section taken about on the line 4—4 of Figure 3 and upon an enlarged scale.

Figure 1:
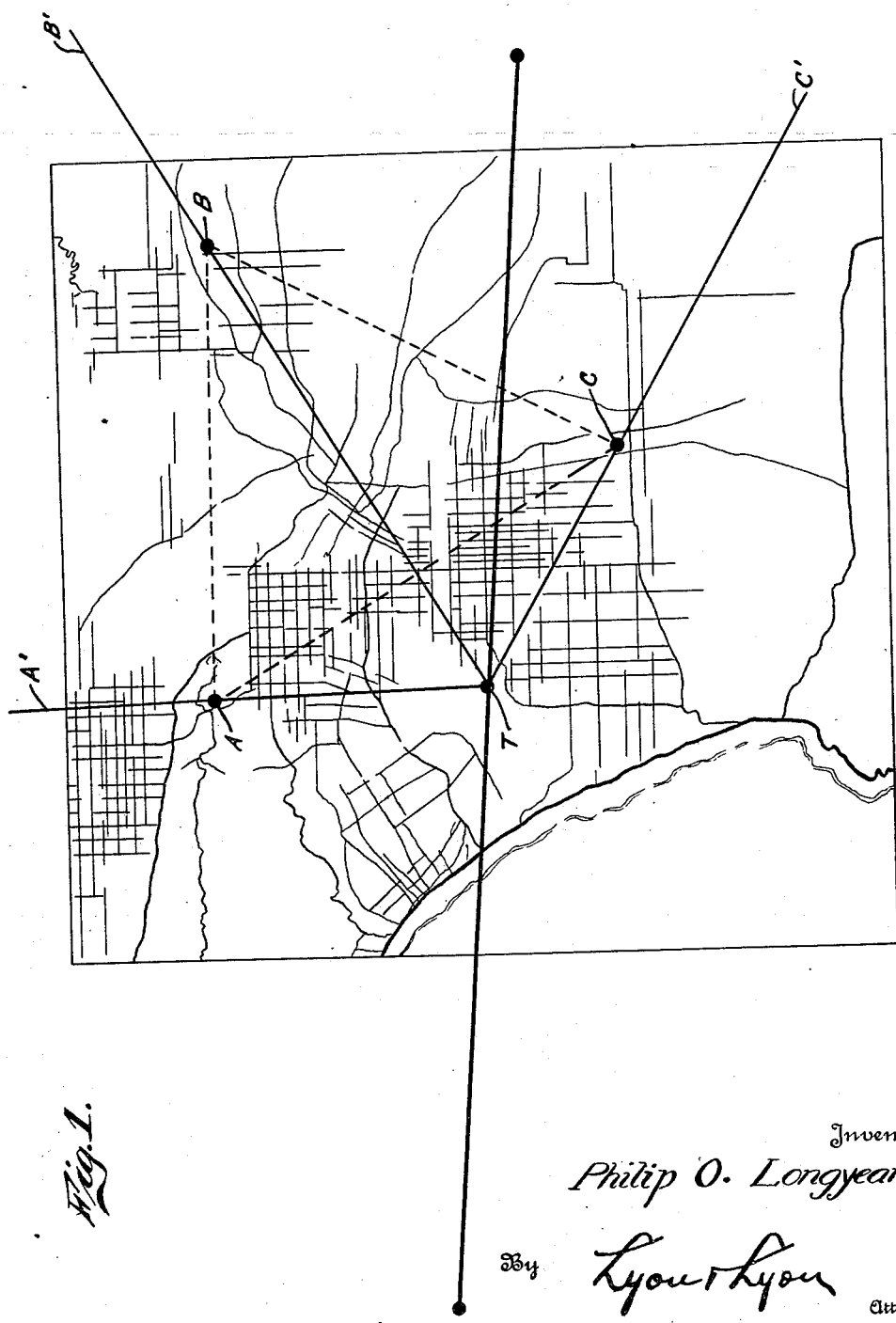
Figure 1 is a diagrammatic plan indicating a map and illustrating the use of the instrument.

Before proceeding to a detailed description of the instrument, it will facilitate the disclosure to state that in practicing the invention I utilize the principle of a surveyor's plane table. The instrument provides means for supporting a map, which map should include in its area the locality of the traveler. A plurality of distant points on the earth are selected as guide stations. The instrument is provided with means for indicating the direction of these three points at any time. In addition to this, the instrument is provided with a plurality of guide arms corresponding respectively to the distant points. Whenever it is desired to indicate the position of the traveler on the map, it is merely necessary to align these guide members or guide arms with the corresponding distant points. The map, which is supported on these guide members, will then be held by them in a definite position, and the intersection point of the guide members or guide arms will indicate the point on the map where the traveler is located.

Any suitable means may be employed for determining the direction of the plurality of guide stations. It is not necessary to employ more than three such guide stations. If desired, wireless impulses may be employed to determine the direction of these three guide stations. This is particularly advantageous where the stations are at such distance as to be invisible to the traveler.

Under these circumstances wireless sending stations will be located at the three guide stations, each station preferably sending out a wireless signal. Though it is not essential, if desired a certain wave length, or different wave lengths recurring in a certain order, may be distinctive of each station according to a predetermined code. In using the instrument for traveling around a certain locality, it may be that the guide stations will be visible. For example, when aviators are flying at night at a high elevation cities at a considerable distance may be plainly visible due to the reflection of their light on the sky. Under such circumstances it is not necessary to provide wireless impulses emanating from the different guide stations.

It is not necessary to have distinctive wave length signals because, by the aid of his compass, the aviator can determine which station is in a certain general direction.

I shall now describe the instrument and explain its use, including the means for cooperating with wireless signals, to determine the direction of the different guide stations.

The instrument comprises a frame 1 which preferably includes an elongated bar 2 with a short post 3 extending upwardly at each end. This frame supports a plurality of guide members preferably consisting of three bars $a$, $b$, and $c$, which are mounted for rotation on a common vertical axis at the middle of the bar 2 (see Figure 4). These guide members support the map 4, which may be formed of stiff material so as to be rigid. I prefer, however, to employ a map of any kind of material and mount it on a rigid plate or platen 5 which may be of rectangular or square form, as indicated by the outline in Figure 2.

The platen is preferably formed of a light rigid board, such as wall board or similar material.

The arms $a$, $b$ and $c$ support the platen carrying the map. Of course, if the map is on rigid material they can support the map directly instead of supporting the platen carrying the map. The underside of the platen is provided with means for slidably and rotatably attaching it at three points corresponding to the three arms $a$, $b$ and $c$. For this purpose I prefer to provide each guide arm with a sliding sleeve 6, the upper end of which is formed into a pin 7 that is received in a corresponding socket 8 secured to the underside of the platen.

Referring to Figure 1, suppose that the traveler's position is at the point T on the map. Let us assume that three distant points along the lines A', B' and C' are selected as guiding stations for a traveler, and let us assume that the distance of the station on the line A' is represented by the distance from T to A, and also that the distance to the station on the line B' is represented by the distance T—B. Likewise the distance to the station on the line C' is represented by the length of the line T—C. Let us assume also that the arm $a$ corresponds to the station on the line A', and likewise as to the other arms; for example, the arm $b$ corresponds to the station on the line B'. The sockets 8 should be attached to the underside of the platen in the same relative position as the points A, B and C, as indicated in Figure 1, while the map is held with the traveler's position on the map at the point T.

If these sockets are attached in these relative positions, the instrument will function so that if the traveler moves to another point on the map and the arms $a$, $b$ and $c$ are aligned with their corresponding guide stations, the intersection of these arms will be located over the point on the map where the traveler is located.

Any suitable means may be provided for indicating a point in alignment with the pivotal axes of these arms on the upper side of the map. For this purpose, I may employ a tightly stretched wire 9, the middle point of which is provided with a downwardly projecting pointer 10 (see Figure 3).

Any suitable means may be provided for lining up the arms $a$, $b$ and $c$, so as to point them at the distant stations on the lines A', B' and C', respectively. If the instrument is used in conjunction with wireless waves sent out from the different stations, I prefer to provide three indicating units corresponding, respectively, to the different arms. In order to accomplish this, I provide a wire loop $11^a$ corresponding to the arm $a$, and a wire loop $11^b$ corresponding to the arm $b$. The wire loop $11^a$ is secured rigidly on a shaft $12^a$ rotatably mounted in the lower end of the post 3 at one side of the frame, and this shaft $12^a$ is provided with means for communicating its rotation to its corresponding arm $a$. In order to accomplish this the shaft $12^a$ is provided with a beveled gear $13^a$ that meshes with a corresponding beveled gear on a shaft $14^a$ that extends along under the bar 2, and is connected through the beveled gears $15^a$ and $16^a$ with a tubular shaft $17^a$ that is rotatably mounted at the middle of the bar 2 to rotate on a vertical axis. The upper end of this tubular shaft $17^a$ carries the arm $a$ (see Figure 4). This construction is duplicated for the other side of the instrument, that is to say, the loop $11^b$, when it rotates, will communicate its rotation to a shaft $14^b$ that in turn communicates its rotation through beveled gears $15^a$ and $16^a$ of equal diameter, the latter gear being rigidly secured to a tubular shaft $17^b$ that carries the arm $b$ at its upper end.

The arm $c$ is attached to a central shaft $17^c$ that extends down through the tubular shafts $17^a$ and $17^b$, and this shaft is extended below the gear wheels $15^a$ and $16^a$, so as to carry the loop $11^c$. Each loop, for example the loop $11^b$, is provided with two rings 18 and 19 that are connected to the opposite ends of the conductor forming the loop, and these rings are touched by two brushes 20 that are included in an electric circuit 21. Near the operator's position an indicator $22^b$ of ammeter type is provided, which indicates the intensity of current flowing in the circuit 21. This circuit includes a battery 23 or other source of E. M. F., which will give a normal uniform current.

In the same way, he rotates the loop $11^c$ by means of the hand wheel 24, and when the pointer of the indicator $22^c$ indicates a maximum current, he leaves this loop in this position. The loop $11^c$ is of course mounted in a plane that coincides with the vertical plane passing through the arm c. Consequently, all of the arms will then point toward their corresponding guide stations. In moving the arms with the loops, the platen 5 will of course become shifted and by observing the position of the pointer 10 on the map, the traveler knows his own geographical position. It should be noted that the points of the compass have nothing to do with the operation of this device. The map floats, as it were, on the arm $a$, $b$ and $c$, and in any position that the traveler has on the earth, when the arms are aligned on the guide stations, the traveler's position will be always indicated under the pointer 10, and the map will have the same orientation as it had at starting. Of course, the north point would be at the top of the map.

While I prefer to employ the stretched wire 9 with the central pointer 10, it will be evident that any other means can be employed for indicating the location of the common axis of the three arms $a$, $b$ and $c$, on the map.

As regards the circuits, such as the circuit 21, it should be understood that the circuits indicated are merely for the purpose of illustration, and any apparatus or accessories may be used in these circuits, such as are now employed in direction finding circuits of apparatus that cooperates with wireless impulses to indicate the direction from which such impulses originate.

Each arm is connected with its corresponding loop, so that the arm is maintained parallel with its corresponding loop, that is to say, with the plane of the loop.

An indicator $22^a$ is also provided near the operator's position connected into a circuit with the loop $11^a$ by similar apparatus as described in connection with the loop $11^b$. A similar circuit $21^c$ is provided in connection with the loop $11^c$ and including an indicator $22^c$, which is located at the operator's position.

The shaft $14^a$ and the shaft 14 are provided with hand wheels 23, enabling the same to be rotated at will. A similar hand wheel 24 is provided on the extension of the central shaft $17^c$.

I will now describe the mode of operation of the apparatus. Having mounted the platen carrying the map on the riders 6 of the guide members $a$, $b$ and $c$, the operator should note that the point at which he is located on the map when he starts should be directly under the pointer 10. This will occur if the sockets on the underside of the platen are located as explained above. The traveler then proceeds on his way and when he desires to ascertain his position on the map 4, he rotates the loops $11^a$, $11^b$ in succession by means of the hand wheels 23 and observes the pointers of the indicators $22^a$ and $22^b$. When these pointers indicate a maximum current, he leaves the loops in the position which they then have. He will then know that the two arms $a$ and $b$ are aligned with the distant guide stations.

By operating the loop $11^c$ in the same way, and observing its indicator $22^c$, he can determine the direction of the third or C' station, and leave the arm $c$ pointing at it. His own position on the map will be under the pointer 10.

It is obvious that in using this instrument when a traveler arrives near his destination, he can, if he pleases, substitute a local map on a larger scale. This local map would, of course, have its sockets 6 attached in a certain relative position corresponding to the new local guide station selected by the traveler or aviator for guiding him when near his destination.

In practical use it is preferable to have the taut wire 9 extending in a front and rear direction on the vehicle, that is to say, the wire preferably extends in the direction in which the vehicle is moving. This makes it more convenient to locate the objective point on the map.

It is to be understood that the embodiment of the invention described herein is only one of the many embodiments that this invention may take, and I do not wish to be limited in the practice of the invention, nor in the claims, to the particular embodiment set forth.

What I claim is:

1. In indicating apparatus for indicating the geographical position of a traveling vehicle, the combination of a map corresponding to the local geographical position of the vehicle, a platen supporting the map, a plurality of guide members having a common pivotal axis on the vehicle and capable of swinging in a substantially horizontal plane, means for indicating the direction of distant points on the earth corresponding to the said guide members to enable the said guide members to be pointed respectively at the said distant points, and riders mounted respectively on the said guide members with means for pivotally connecting the same at fixed points respectively on the said map.

2. In indicating apparatus for indicating the geographical position of a traveling vehicle, the combination of a map corresponding to the local geographical position of the vehicle, a platen supporting the map, a plurality of guide members having a common pivotal axis on the vehicle and capable of swinging in a substantially horizontal plane, means for indicating the direction of distant points on the earth corresponding to the said guide members to enable the said guide members to be pointed respectively at the said distant points, riders mounted respectively on the side guide members with means for pivotally connecting the same at fixed points respectively on the said map, and a pointer carried in a relatively fixed position on the vehicle for indicating the position of the vehicle on the said map.

3. In indicating apparatus for indicating the geographical position of a traveling vehicle, the combination of a map corresponding to the local geographical position of the vehicle, a platen carrying the map, a plurality of guide members having a common pivotal axis on the vehicle and capable of swinging independently in a substantially horizontal plane, means carried on the vehicle for indicating the direction of distant points on the earth corresponding to the said guide members to enable the said guide members to be aligned respectively with the said distant points, and riders mounted to slide on the said guide members, and pivotally connected respectively with the under side of the platen at fixed points.

4. In indicating apparatus for indicating the geographical position of a traveling vehicle, the combination of a map corresponding to the local geographical position of the vehicle, a platen carrying the map, a plurality of guide members having a common pivotal axis on the vehicle and capable of swinging independently in a substantially horizontal plane, a direction indicating unit corresponding to each guide member and carried on the vehicle for indicating the direction of distant points on the earth corresponding to the said guide members to enable the said guide members to be aligned respectively with the said distant points, riders mounted to slide on the said guide members, and sockets attached to the under side of the platen pivotally connecting with the said riders respectively.

5. In indicating apparatus for indicating the geographical position of a traveling vehicle, the combination of a map corresponding to the local geographical position of the vehicle, a platen carrying the map, a plurality of guide members having a common pivotal axis on the vehicle and capable of swinging independently in a substantially horizontal plane, a direction indicating unit corresponding to each guide member and including a conductive loop mounted to rotate on a substantially vertical axis, and a circuit passing through the loop, an indicator at the observer's position in the vehicle controlled by the circuit for indicating the direction of distant points on the earth corresponding to the said guide members to enable the operator of the vehicle to align the guide members respectively with the said distant points, and means for pivotally and slidably connecting the said platen at a plurality of fixed points on the same to the said guide members respectively.

6. In indicating apparatus for indicating the geographical position of a traveling vehicle, the combination of a map corresponding to the local geographical position of the vehicle, a platen carrying the map, a plurality of guide members having a common pivotal axis on the vehicle and capable of swinging independently in a substantially horizontal plane, a direction indicating unit corresponding to each guide member and including a conductive loop mounted to rotate on a substantially vertical axis, and a circuit with an indicator at the observer's position in the vehicle for indicating the direction of distant points on the earth corresponding to the said guide members to enable the operator of the vehicle to align the guide members respectively with the said distant points, means for pivotally and slidably connecting the said platen at a plurality of fixed points on the same to the said guide members respectively, means for connecting the said conductive loops respectively with the said arms to maintain a definite angular relation between the plane of each loop and the oriented position of its corresponding arm.

7. In indicating apparatus for indicating the geographical position of a traveling vehicle, the combination of a map corresponding to the local geographical position of the vehicle, a platen carrying the map, a plurality of guide arms having a common pivotal axis on the vehicle and capable of swinging independently in a substantially horizontal plane, a direction indicating unit carried on the vehicle corresponding to each arm with means connecting the same with its corresponding arm to enable each arm to be aligned with a corresponding distant point on the earth, and riders mounted to slide on the said bars and pivotally connected respectively at fixed points on the under side of the platen.

8. In indicating apparatus for indicating the geographical position of a traveling vehicle, the combination of a map corresponding to the local geographical position of the vehicle, a platen carrying the map, a plurality of guide arms having a common pivotal axis on the vehicle and capable of swinging independently in a substantially horizontal plane, a direction indicating unit carried on the vehicle corresponding to each arm including a conductive loop mounted to rotate on a substantially vertical axis and having a shaft with means connecting the same to its corresponding guide arm to hold the guide arm in a position substantially parallel with the plane of the loop, and riders mounted to slide on the said bars and pivotally connected respectively at fixed points on the under side of the platen.

9. In indicating apparatus for indicating the geographical position of a traveler, the combination of a frame, a plurality of arms pivotally mounted on a common axis on the frame, a map-carrying platen, riders mounted to slide freely on the arms and pivotally connected to the platen so that when the arms are in a certain relation the map will be held in a certain relation.

10. In indicating apparatus for indicating the geographical position of a traveler, the combination of a frame, a plurality of arms pivotally mounted on a common axis on the frame, a map-carrying platen, riders mounted to slide freely on the arms and pivotally connected to the platen so that when the arms are in a certain relation the map will be held in a certain relation, said platen being located over the common axis of said arms, and means for indicating on the map the location of said common axis.

11. In indicating apparatus for indicating the geographical position of a traveler, the combination of a frame, a plurality of arms pivotally mounted on a common axis on the frame, a map-carrying platen, riders mounted to slide freely on the arms and pivotally connected to the platen so that when the arms are in a certain relation the map will be held in a certain relation, said platen being located over the common axis of said arms, means for indicating on the map the location of said common axis, and means associated with the apparatus for indicating the direction of distant points on the earth corresponding to the said arms.

Signed at Los Angeles, California, this 19th day of July, 1929.

PHILIP O. LONGYEAR.